(12) United States Patent
Chang et al.

(10) Patent No.: US 6,275,637 B1
(45) Date of Patent: *Aug. 14, 2001

(54) THERMALLY EXPANDED MULTIPLE CORE FIBER BASED REFLECTION TYPE OPTICAL ISOLATOR

(75) Inventors: Kok Wai Chang, Sunnyvale; Yong Huang, San Jose, both of CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/346,202

(22) Filed: Jun. 30, 1999

Related U.S. Application Data

(63) Continuation-in-part of application No. 09/275,354, filed on Mar. 23, 1999, now Pat. No. 6,078,716.
(51) Int. Cl.[7] ............................................. G02B 6/02
(52) U.S. Cl. ............................. 385/126; 385/47; 385/11
(58) Field of Search ............................... 385/11, 14, 15, 385/18, 24, 31, 33, 42, 43, 47, 122–126; 359/281, 282, 485, 494, 495

(56) References Cited

U.S. PATENT DOCUMENTS

| | | | |
|---|---|---|---|
| 4,178,073 | 12/1979 | Uchida et al. | 350/151 |
| 4,653,852 | 3/1987 | Suzuki et al. | 350/96.33 |
| 4,974,944 | 12/1990 | Chang | 350/377 |
| 5,268,979 | 12/1993 | Weidman | 385/42 |
| 5,355,426 | 10/1994 | Daniel et al. | 385/39 |
| 5,381,503 | 1/1995 | Kanamori et al. | 385/123 |
| 5,446,578 | 8/1995 | Chang et al. | 359/282 |
| 5,471,340 | 11/1995 | Cheng et al. | 359/281 |
| 5,574,596 | 11/1996 | Cheng | 359/484 |
| 5,594,821 | 1/1997 | Cheng | 385/24 |
| 5,644,666 | 7/1997 | Campbell et al. | 385/43 |
| 5,734,763 | 3/1998 | Chang | 385/11 |
| 5,768,005 | 6/1998 | Cheng et al. | 359/281 |
| 5,825,950 | 10/1998 | Cheng | 385/27 |
| 6,097,869 | * 8/2000 | Chang et al. | 385/126 |

* cited by examiner

Primary Examiner—Phan T. H. Palmer
(74) Attorney, Agent, or Firm—Lacasse & Associates; Randy W. Lacasse; Kevin E. Greene

(57) ABSTRACT

An optical isolator coupled to a thermally expanded multiple core fiber. The thermally expanded multiple core fiber having at least one input core and one output core. The optical isolator to propagate light from an input core to an output core, while inhibiting the propagation of light from an output core to an input core of the thermally expanded multiple core fiber. The fiber cores having expanded mode field diameters that may facilitate coupling to the optical isolator and reduce component size in the optical isolator.

20 Claims, 14 Drawing Sheets

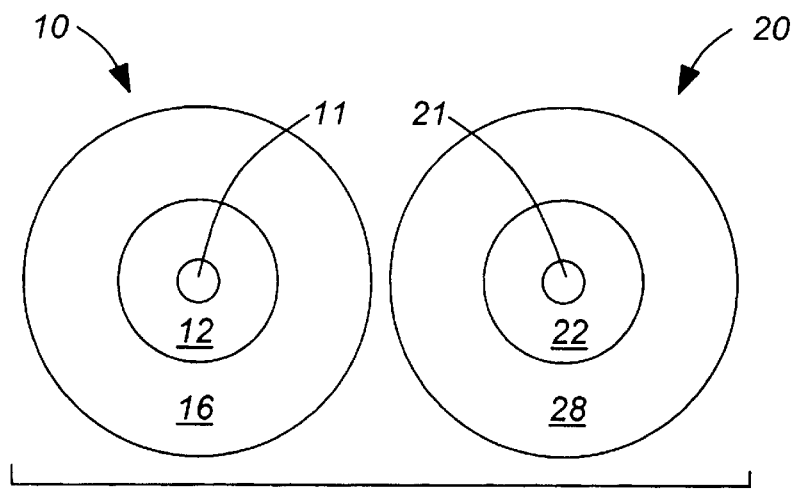
FIG. 1
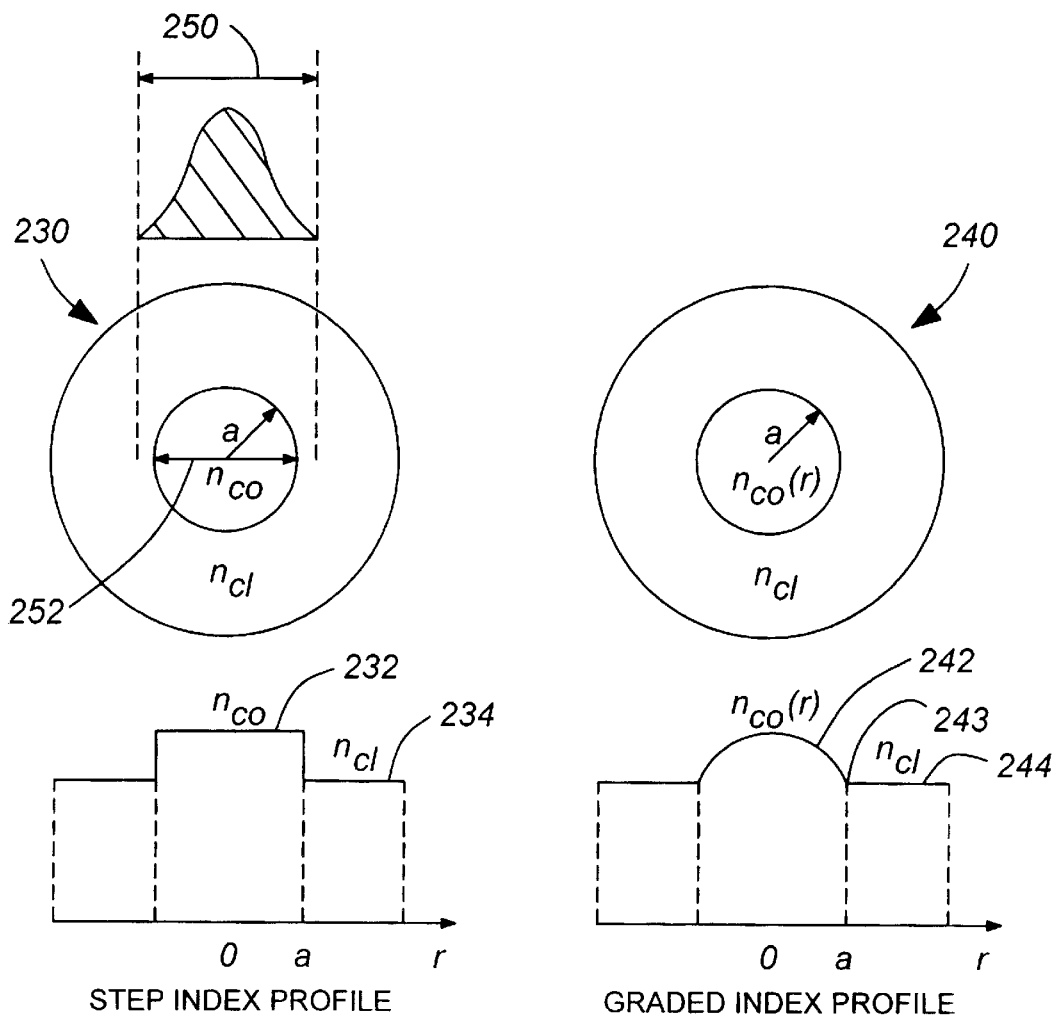
FIG. 2A      FIG. 2B

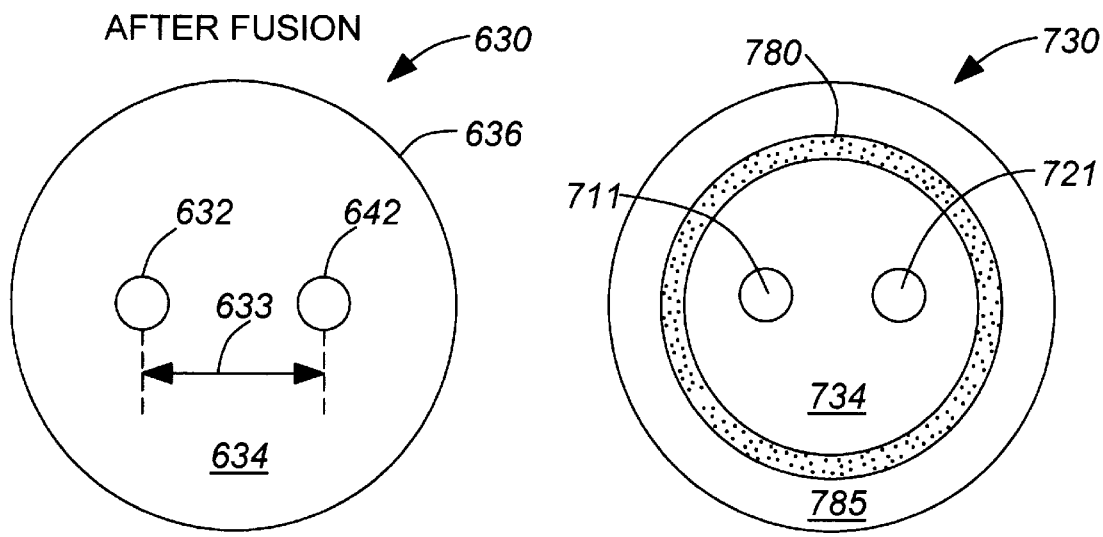
FIG. 6  FIG. 7B
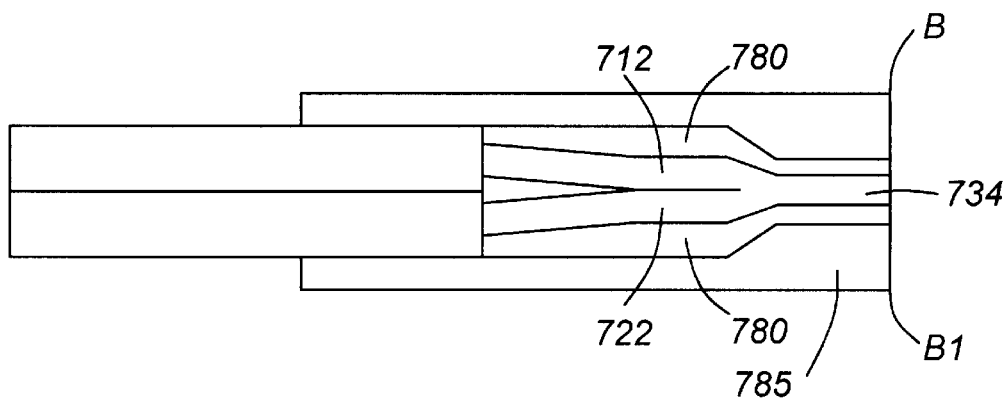
FIG. 7A

THERMALLY EXPANDED MULTIPLE CORE FIBER BASED REFLECTION TYPE OPTICAL ISOLATOR

REFERENCE TO RELATED APPLICATION

This is a continuation-in-part of application Ser. No. 09/275,354, filed Mar. 23, 1999 now U.S. Pat. No. 6,078,716.

FIELD OF THE INVENTION

This invention relates to the field of fiber optics and, more specifically, to reflection type optical isolators.

BACKGROUND

Fiber optics are used in many applications including telecommunication and instrumentation. These applications transmit data by pulsing light waves through optical fibers. These optical fibers typically consist of one or more cores surrounded by a cladding, and a protective jacket. Optical components coupled to these fibers operate on light propagated through them, for example, optical isolators.

Optical isolators are used in fiber optic systems to propagate signals in a direction while preventing propagation of signals along a reverse of the direction. These optical isolators are often used to prevent unwanted signal reflections from being transmitted back to a signal's source. Typical optical isolators have components to separate, rotated, and recombine orthogonally polarized light. These components function to propagate light beams from the input to the output of the isolator while diverting light beams traveling in the opposite direction to prevent them from reaching the input port.

One type of optical isolator uses an isolator core positioned in-line between two lenses to couple light from an input fiber to an output fiber. The isolator core has, in sequence, an input walk-off crystal, a Faraday rotator, a half-wave plate, and an output walk-off crystal. In the forward direction, the input walk-off crystal divides an incident light beam from the input fiber into two polarized rays that are rotated by the Faraday rotator and the half-wave plate and then recombined by the output walk-off crystal. A Faraday rotator is a non-reciprocal device that rotates the polarization of light rays in the same direction regardless of which direction rays are passed through the device.

In the reverse direction, the output walk-off crystal also divides a light beam into two polarized rays. However, the non-reciprocal function of the Faraday rotator prevents the polarization of light traveling in the reverse direction from being rotated back to a position that will allow the two rays to be recombined by the input walk-off crystal. In this manner, light is prevented from reaching the input fiber in the reverse direction through the isolator core.

One problem with such an optical isolator is that the number and size of individual components adds to the overall length and size of the optical isolator, thereby decreasing its desirability.

SUMMARY OF THE INVENTION

The present invention pertains to an optical isolator. The optical isolator may include a thermally expanded multiple core fiber having at least one input core and at least one output core. The optical isolator may also include an isolator core coupled to the thermally expanded multiple core fiber to propagate light from the at least one input core to the at least one output core and inhibit the propagation of light from the at least one output core to the at least one input core.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which:

FIG. 1 illustrates a cross-section of two single core fibers.

FIG. 2a illustrates the profile of a step index fiber.

FIG. 2b illustrates the profile of a graded index fiber.

FIG. 6 illustrates a cross-section of one embodiment of a fiber after a fusion process.

FIG. 7A illustrates one embodiment of a multiple core fiber in a capillary tube.

FIG. 7B illustrates a cross-section of one embodiment of a multiple core fiber in a capillary tube.

DETAILED DESCRIPTION

Figure 3:
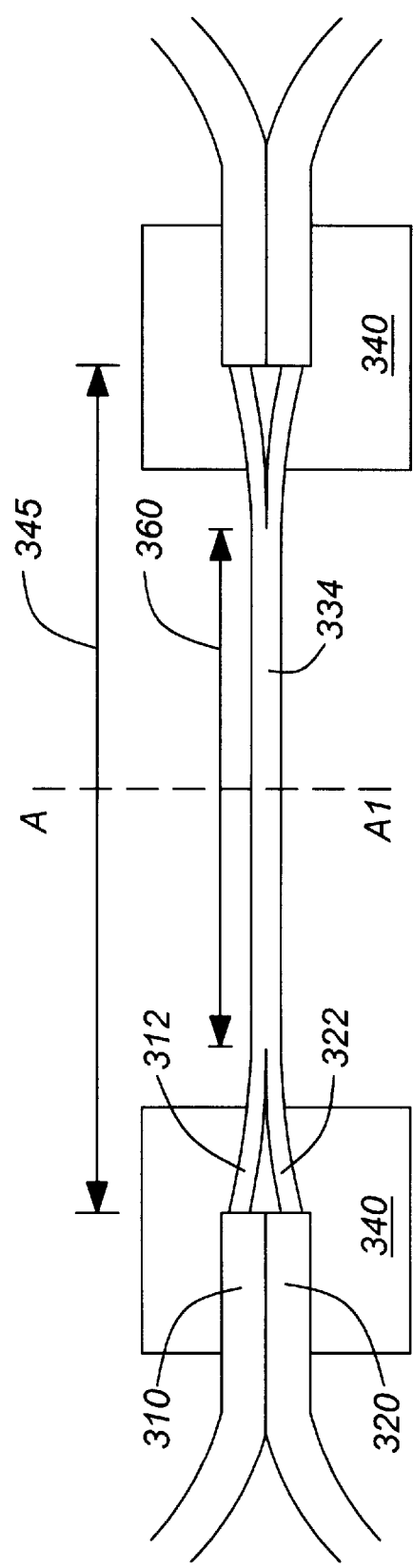
FIG. 3 illustrates one embodiment of a fusion process.

In the following description, numerous specific details are set forth such as examples of specific materials, process steps, process parameters, dimensions, etc. in order to provide a thorough understanding of the present invention. It will be obvious, however, to one skilled in the art that these specific details need not be employed to practice the present invention. In other instances, well known materials or methods have not been described in detail in order to avoid unnecessarily obscuring the present invention. It should be noted that the designations clockwise and counterclockwise refer to the polarization rotations of light beams relative to their illustration in the Figures.

An apparatus for isolating optical signals is described. The apparatus includes an optical isolator and a thermally expanded multiple core (TEMC) fiber. The TEMC fiber includes at least one input core and one output core. In one embodiment, the optical isolator includes an isolator core that operates to propagate light in a forward direction from the input core to the output core of the TEMC fiber. The isolator core also operates to inhibit light propagated in a backward direction from the output core to the input core.

In one embodiment, the optical isolator also includes a lens coupled to the isolator core and a mirror coupled to the lens. The lens collimates light received from the input core onto the mirror. The mirror and lens operate to propagate light to a location of the isolator core such that the light from the input core is coupled to the output core of the TEMC fiber.

In one of the embodiments described below, a fusion process is used to manufacture the TEMC fiber resulting in a fiber having cores spaced close together with expanded mode field diameters. The close spacing between the cores of the TEMC fiber may reduce the angle of reflection off the mirror necessary to couple light from the input core to the output core, thereby reducing the size of the optical isolator. The expanded mode field diameters of the cores may reduce the amount of divergent light emitted from the cores, thereby improving the efficiency of light coupling between the input core and the output core and eliminating the need for lenses to collimate light between the TEMC fiber and the optical isolator.

In one embodiment, the TEMC fiber is manufactured using multiple single core fibers as illustrated in FIG. 1. It should be noted that two fibers are shown in some of the following figures only for ease of illustration and that the multiple core fiber and its fabrication process are not limited to only two fiber cores.

FIG. 1 illustrates a cross-section of two single core fibers. The fibers 10 and 20 have cores 11 and 21, respectively, surrounded by claddings 12 and 22, respectively. The claddings 12 and 22 are encased in outer jackets 16 and 18, respectively (not drawn to scale). In one embodiment, single mode fibers having step index core profiles are used, for example, SMF 28 manufactured by Corning of Corning, N.Y. SMF 28 fiber has a nominal mode field diameter of approximately 9 microns ($\mu$m). In another embodiment, single mode fibers having other diameters and profiles may be used. In yet another embodiment, fibers carrying more than one mode may be used.

In cores having step index profiles, light waves follow straight line trajectories until they reach the core-cladding boundary, at which the light waves bend abruptly. The propagation of the light waves through the core is based on the numerical aperture (NA) of the core, which is a function of the index of refraction of the core. The numerical aperture is independent of the position of the incident waves because cores with step index profiles have the same index of refraction throughout their radius.

In contrast, for cores with graded index profiles, the index of refraction is a function of the distance along the diameter of the core. Thus, light waves bend continuously, rather than abruptly, near the core-cladding boundary for graded index profile cores. In addition, because the index profile is graded, the numerical aperture of the core is a function of the position of the entering light waves.

FIGS. 2a and 2b illustrate the profiles of a step index fiber and a graded index fiber, respectively. The nomenclature $n_{co}$ is the index of refraction of the core and $n_{cl}$ is the index of refraction of the cladding. For a step index fiber 230 the index of refraction 232 is approximately uniform in the core region. The index of refraction steps down at the core boundary to a lower index of refraction 234 in the cladding region where it remains approximately uniform throughout the cladding. A lower index or refraction is used in the cladding in order to achieve total internal reflection of the light beam as it travels along the core.

For a graded index fiber 240, see FIG. 2b, the index of refraction in the core region 242 is a function of the radial distance from the core center. The index of refraction in the core 242 is given by $n_{co}(r)$ with $r \leq a$ where a is the core radius and r is the radial distance from the core center. The index of refraction in the core 242 decreases as the radial distance from the core increases until it approximately matches the index of refraction of the cladding 244 at the boundary 243.

Light waves propagating down the core and cladding of the fiber can be characterized by different modes based on electric, magnetic, and electromagnetic fields operating on the fiber. In step index fibers with circular cross sections, as illustrated in FIG. 2a, the field distributions can be identified by a combination of the different modes, known as a mode field. The mode field has a light carrying diameter that is not the same as the physical diameter of the fiber. The mode field diameter, for any given wavelength of light, is affected by the indices of refraction of the core and the cladding. The mode field diameter (MFD) is characterized by a hyperbolic function that may be approximated according to the following formula:

$$MFD = 2\omega$$

where $$\omega \approx (NA \times \pi)/\lambda$$

and where $\lambda$ equals the wavelength of light propagated through the fiber.

The mode field diameter may extend out into the cladding region and, as such, will be larger than the physical diameter of the core. In one embodiment, for example, for light waves having a wavelength of 1550 nanometers, the mode field diameter 250 may be approximately 9 $\mu$m, whereas the physical core diameter 252 may be approximately 8 $\mu$m.

Referring again to FIG. 1, the single core fibers 10 and 20 are stripped of a portion of their outer jackets 16 and 28, and the claddings 12 and 22 are aligned together along a predetermined length of the exposed claddings. In one embodiment, the claddings 12 and 22 are aligned by placing claddings 12 and 22 on a plate such that the centers of their respective cores are in substantial alignment along one line and held in place using a securing tool. The claddings 12 and 22 are then joined along the predetermined length using a fusion process.

FIG. 3 illustrates one embodiment of a fusion process. The single core fibers 310 and 320 are stripped of their outer jackets, exposing claddings 312 and 322 along segment 345 of the fibers. The fibers 310 and 320 are then placed on an alignment bar 340 that aligns the claddings 312 and 322 along a length 360. In one embodiment, the claddings 312 and 322 are aligned along a length 360 of approximately 8 millimeters. In another embodiment, the claddings 312 and 322 are aligned along a different length.

In one embodiment, a heat source (not shown) located underneath claddings 312 and 322 is applied along the entire length 360. Claddings 312 and 322 are heated to a temperature above the melting point of the cladding material in order to fuse the cladding 312 and 322 of the two cores (not shown). The claddings 312 and 322 are fused together along length 360 forming a common cladding 334. In one embodiment, heat source 470 is a gas flame. In another embodiment, other heat sources may be used that are well known in the art, for examples, an induction heater or a laser.

In one embodiment, the claddings 322 and 312 are heated to a temperature of approximately 1,700 degrees C+/−200 degrees C. In another embodiment, the claddings are heated to other temperatures based on the material used for claddings 322 and 312. As the claddings 312 and 322 are fused together, the heat source operates to gradually expand the mode field diameter of the cores (not shown) in the common cladding region along length 360. The mode field diameters of claddings 312 and 322 outside of length 360 will also be affected by the heat source. However, the mode field diameters of claddings 312 and 322 outside length 360 will expand to a lesser extent than the mode field diameters within common cladding 334 because the claddings outside length 360 are not directly exposed to the heat source and, thus, heated at a lower temperature.

Figure 4:
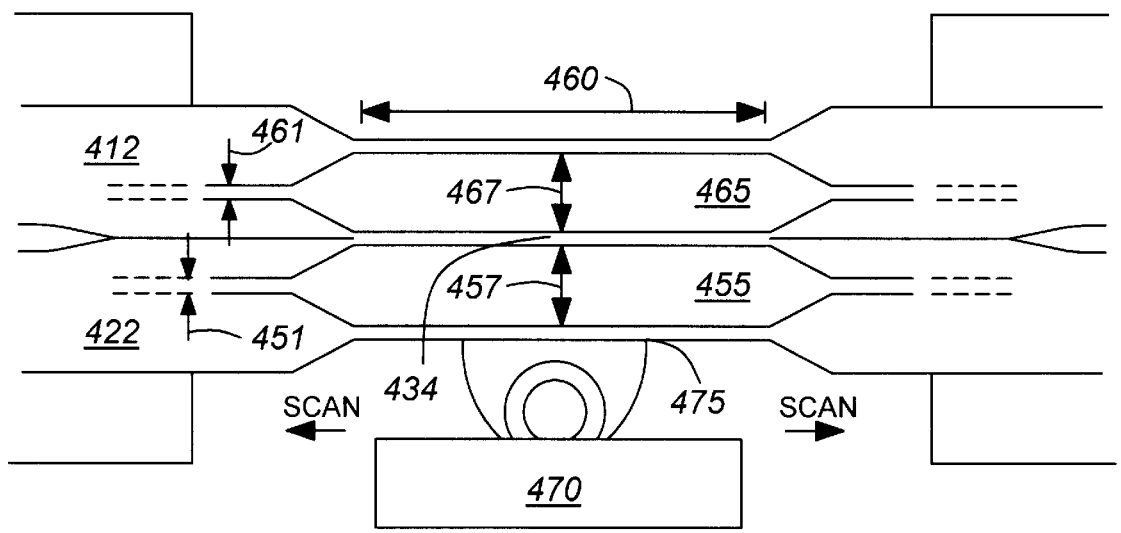
FIG. 4 illustrates another embodiment of a fusion process.

FIG. 4 illustrates another embodiment of a fusion process. A heat source 470 is applied to the exposed common cladding 434 to expand the mode field diameters of the cores inside the cladding. It should be noted that the heat source 470 is drawn on one side of the cores in FIG. 4 only for ease of illustration and that the heat source 470 is actually positioned in a manner to provide for uniform heating of the claddings.

Heat source 470 is applied to a segment of length 460 and continually scanned across length 460 to uniformly expand the mode fields of the cores. When heat source 470 comes into contact 475 along different segments of length 460, claddings 412 and 422 begin to fuse together forming common cladding 434. In addition, the mode fields 455 and 465 of the cores begin to expand from their original diameters 451 and 461, respectively, to diameters 457 and 467, respectively. As the cladding region 434 is heated, the index profiles of the cores inside cladding region 434 change from a step index to that of a graded index that tapers off at the core-cladding boundary as discussed above. In one embodiment, heat source 470 is scanned at a constant rate across length 460. In another embodiment, heat source 470 is scanned across length 460 at a varying rate in order to gradually expand mode fields from their original diameters at the end of length 460 to diameters 467 and 457 in the middle of length 460.

The mode field expansion in the fiber is based on the rate at which the heat source 470 is scanned across length 460 of the common cladding 434. A slower scan rate will result in a greater mode field expansion if the scan time remains the same. In one embodiment, heat source 470 is scanned at a rate of approximately 2 millimeters per second (mm/sec). In another embodiment, heat source 470 is scanned at a different rate to achieve a different mode field expansion. In another embodiment, the scan rate may be varied in a different manner along length 460, for examples, linearly, exponentially, and incrementally stepped. As a result, the mode fields of the cores are gradually expanded from their initial diameter to a wider diameter at the center of the length 460 of the fused cladding region.

By changing the index of refraction in the cores to a graded index profile and, thus, expanding the mode field diameters of the cores, light may be propagated through a larger area of the fiber. Changing the index of refraction in a fiber core to a graded index profile results in a narrowing of the width of a light pulsed through the fiber that may allow for an increase in information transmission rate through the fiber.

Referring still to FIG. 4, the change in the index profile alters the numerical aperture of the fiber cores (not shown) and increases their mode field diameters to diameters 457 and 467. In one embodiment, after the scanning stage, the mode field diameters of the cores are expanded by approximately a factor of two. In another embodiment, the mode field diameters are expanded by other factors. If the numerical aperture of a starting single mode core is 0.1, for example, and the mode field diameter is expanded by a factor of 2, then the numerical aperture will be approximately reduced by half. Correspondingly, if the mode field diameter is expanded from 10 μm to 30 μm, for example, then the numerical aperture will be approximately reduce by one third. A lower numerical aperture will reduce the amount of divergent light emitted from the fiber and, thus, may facilitate switching between fiber cores or coupling to other fibers.

In another embodiment, the heat source 460 is scanned for a different time and at a different temperature and rate to reflow the cladding material in order to decrease transmission loss in the fiber cores. Various factors cause transmission loss in the fiber including diameter variations, core and cladding material irregularities, and impurities. By reflowing the core and cladding material, these defects may be reduced.

Figure 5:
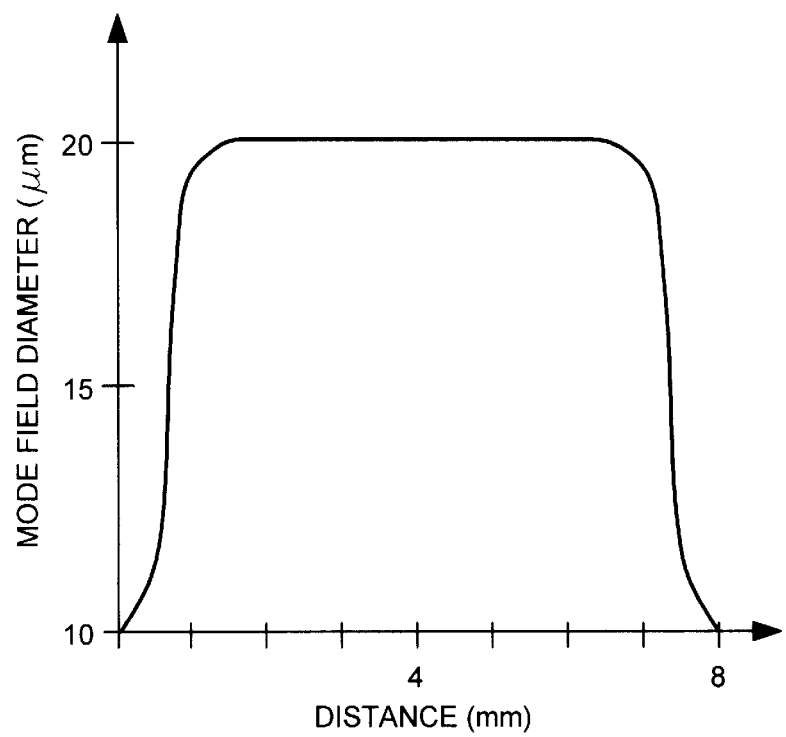
FIG. 5 illustrates a mode field expansion over a length of a fiber.

FIG. 5 illustrates an exemplary mode field expansion over a length of the fiber resulting from use of the above process. In the illustrated example, the mode fields of the fiber cores have been expanded over an 8 mm length of fused cladding material. The mode field diameter of a single core is 10 μm outside the length of the fused cladding material. The heat source is scanned across the 8 mm length, increasing the mode field diameters of the cores to a maximum of approximately 20 μm near the center region of the fused cladding. It should be noted that FIG. 5 illustrates only an example of the mode field distribution. In other embodiments, the mode field diameter may have other distributions over the length of the fused cladding.

FIG. 6 illustrates a cross-section of one embodiment of a fiber after a fusion process. After the fusion process, the cores 632 and 642 of fiber 630 are closer together than before the fusion process. The cores 632 and 642 are also substantially parallel with respect to each other along the length of the fused cladding. In one embodiment, for example, the cladding is fused along a length of 8 millimeters and the centers of the cores 632 and 642 have less than a 4 μm deviation of alignment over the length of the fused cladding. In one embodiment, the spacing 633 between the centers of the cores 632 and 642 after the fusion process is approximately 62.5 μm. In one embodiment, the outer surface 636 of common cladding 634 is approximately circular. In another embodiment, the outer surface 636 of common cladding 634 has other approximate shapes, for example, ovate.

The closer spacing between fiber cores may allow for more precise alignment between the cores than using, for example, two standard 125 μm (outer diameter) single core fibers having centers spaced 125 μm apart, that are inserted into a cylindrical jacket. It should be noted that although the cores have been brought closer together, the distance between the cores remains large enough so that there is no significant coupling, or cross-talk, between the cores.

FIG. 7A illustrates one embodiment of a multiple core fiber in a capillary tube. After the fusion process, the fiber may be cut along a cross section AA1 of FIG. 3 of the region of common cladding and placed into a capillary tube 785 to create a fiber end having multiple non-coupled cores that are in substantial alignment along one line. An epoxy 780 is placed in between the cladding 734 and the capillary tube 780 to hold the cladding stationary within capillary tube 780. Such a fiber may be used in switching or coupling applications with more precision than when using a group of single core fibers placed next to each other. In addition, since the fiber is not processed using a stretching operation, less stress may be introduced into the fiber than in prior fiber coupling processes. Lower stress in the fiber may result in improved signal transmission performance.

FIG. 7B illustrates a cross-section of one embodiment of a multiple core fiber in a capillary tube. The cross-section is taken along line BB1 of FIG. 7A. The cores 711 and 721 of fiber 730 are substantially parallel with respect to each other along the length (into the page) of the common cladding 734. In one embodiment, the common cladding 734 resulting after the fusion process is approximately cylindrical resulting in approximately a uniform gap between common cladding 734 and capillary tube 785. As such, epoxy 780 is generally uniformly distributed between the common cladding 734 and the capillary tube 785. The use of less epoxy and the uniform distribution of the epoxy may reduce stress induce effects resulting from the epoxy, thereby improving the reliability of the fiber.

Figure 8:
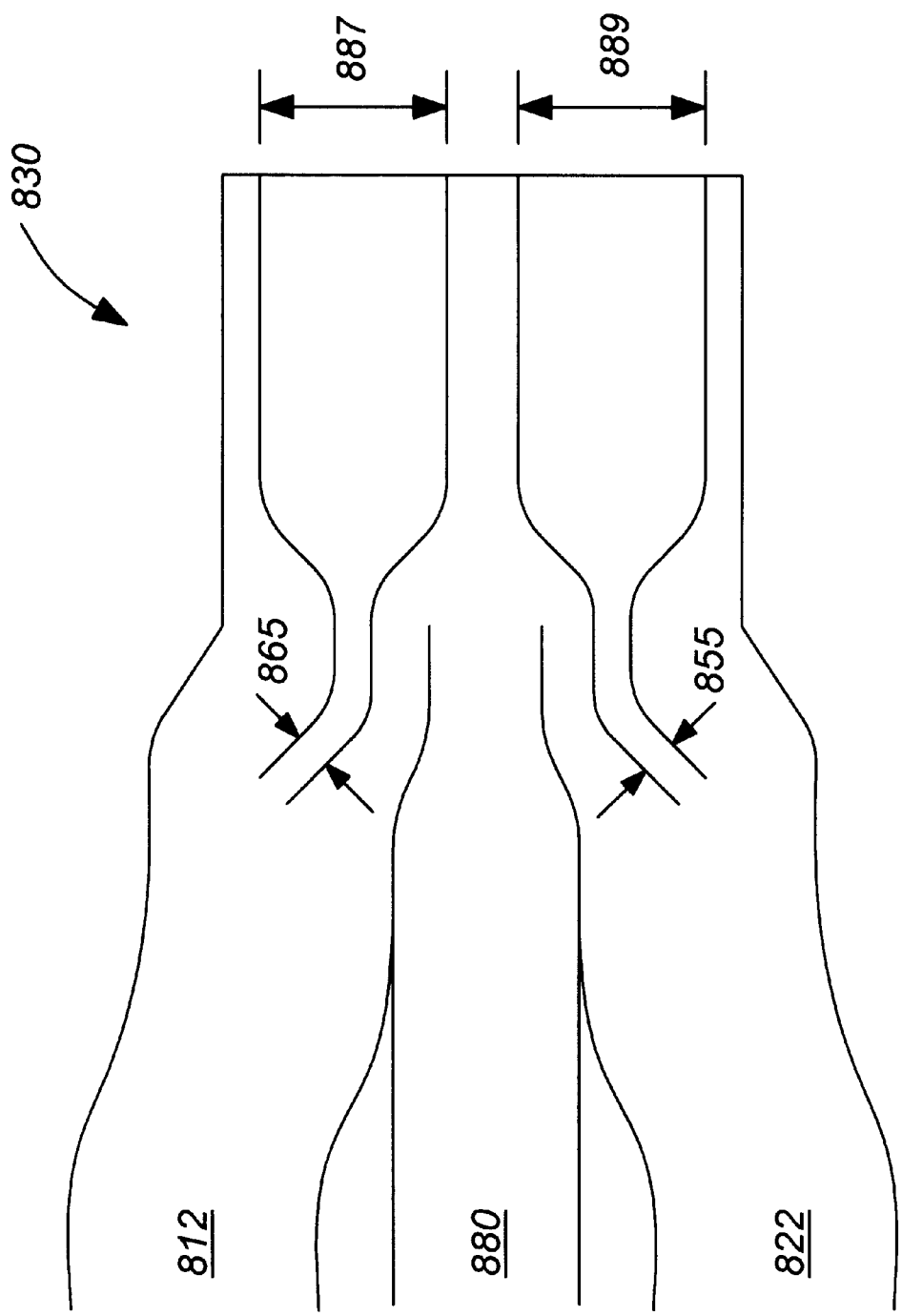
FIG. 8 illustrates a longitudinal cross-section of one embodiment of a multiple core fiber having a non-core spacer.

FIG. 8 illustrates a longitudinal cross-section of one embodiment of a multiple core fiber having a non-core spacer. Multiple core fiber 830 includes a spacer 880 in between claddings 812 and 822. As discussed above, heating the fiber cores results in an expansion of the mode field diameters of the cores. With continued heating, the mode field expansion may become so large that there may be overlap between the mode fields of the different cores within a common cladding. This may result in an undesirable coupling between the signals carried in the different cores. Spacer 880 may be used to physically separate the cores of claddings 812 and 822 so that their mode fields 887 and 889, respectively may be further expanded. The spacer 880 (also known as a non-core fiber) is constructed from a material similar to the cladding material with the same refractive index but with no guiding properties, for example, silica. In one embodiment, spacer 880 is used to allow for greater mode field expansion while minimizing coupling between the cores.

In another embodiment, the non-core spacer 880 may be used to reduce, or even minimize, diffraction effects at the core-air interface. Diffraction effects are caused by interference at the glass-air boundary at the end of the fiber. The diffraction effects result in insertion losses which reduce the amount of power that may be transferred between fibers. By adding a non-core spacer, for example, the total outside diameter of the fiber is increased by a factor of the square root of three. In general, a wider diameter fiber results in less divergence of light waves exiting the end of the fiber.

In addition, the use of the spacer fiber allows for physical separation of the light waves exiting the cores. Light exiting from cores separated by different physical dimensions will have different incident angles on components that are coupled to the end of the fiber. For example, if a lens is coupled to the end of the fiber, the light waves from an outer core separated by two non-core spacers will be incident on the lens at a different angle than light emitted from a central core. In one embodiment, a filter is used to filter out light waves from the cores based on the incidence angle of light on the lens emitted from the cores.

It should be noted that the process described herein is not limited to only twin core fibers or fibers using a single spacer and may be used to manufacture fibers having more than two cores and utilizing more than a single spacer as illustrated in FIG. 8.

Figure 9:
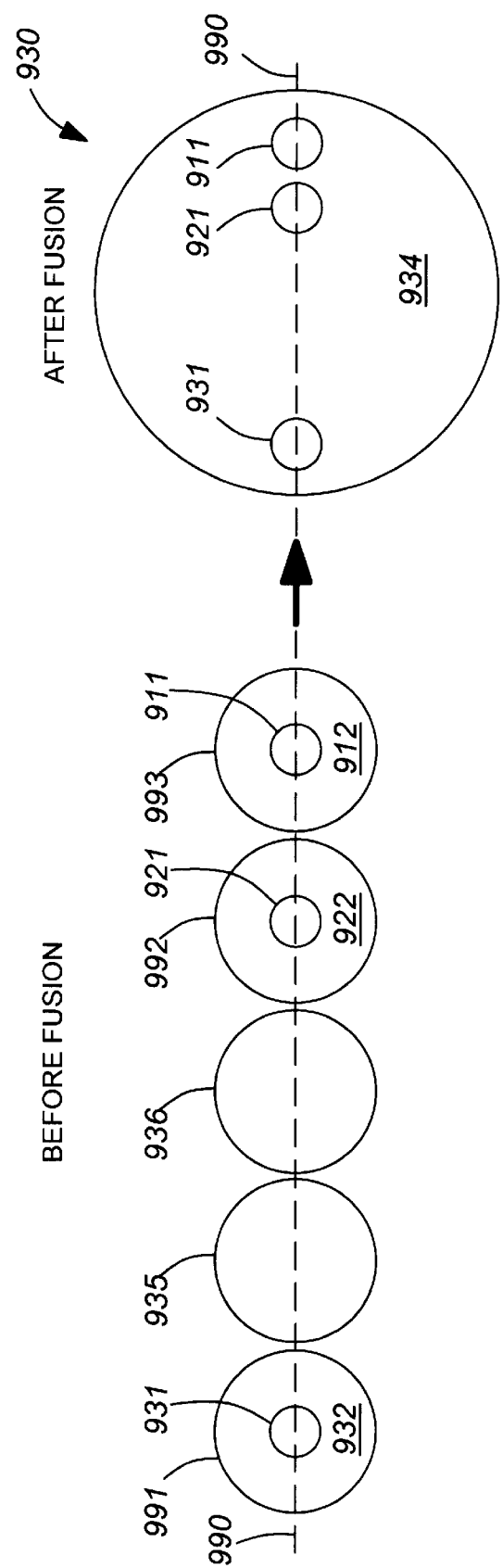
FIG. 9 illustrates a cross-section of one embodiment of a multiple core fiber having multiple non-core spacers.

FIG. 9 illustrates a cross-section of one embodiment of a multiple core fiber having multiple non-core spacers. In one embodiment, two spacers 935 and 936 are positioned between core fibers 991 and 992 that are stripped of their protective jackets. A third core fiber 993 is positioned on the side of core fiber 992 opposite that of core fiber 992. In an alternative embodiment, a different number of spacers may be used in between core fibers. In yet another embodiment, spacers may be placed on the outside of core fibers.

Multiple core fiber 930 is manufactured using a fusion process similar to that described above. After the fusion process, multiple core fiber 930 has three cores 911, 921, and 931, surrounded by a common cladding 934. During the fusion process, the spacers 935 and 936 become fused with the claddings 921, 922, and 932 that surround cores 911, 921, and 931, respectively. The common cladding 934 exists along a length of the claddings and spacers (into the page) that are aligned with each other during the fusion process. The cores 911, 921, and 931 have centers that are substantially aligned in one line 990.

Figure 10:
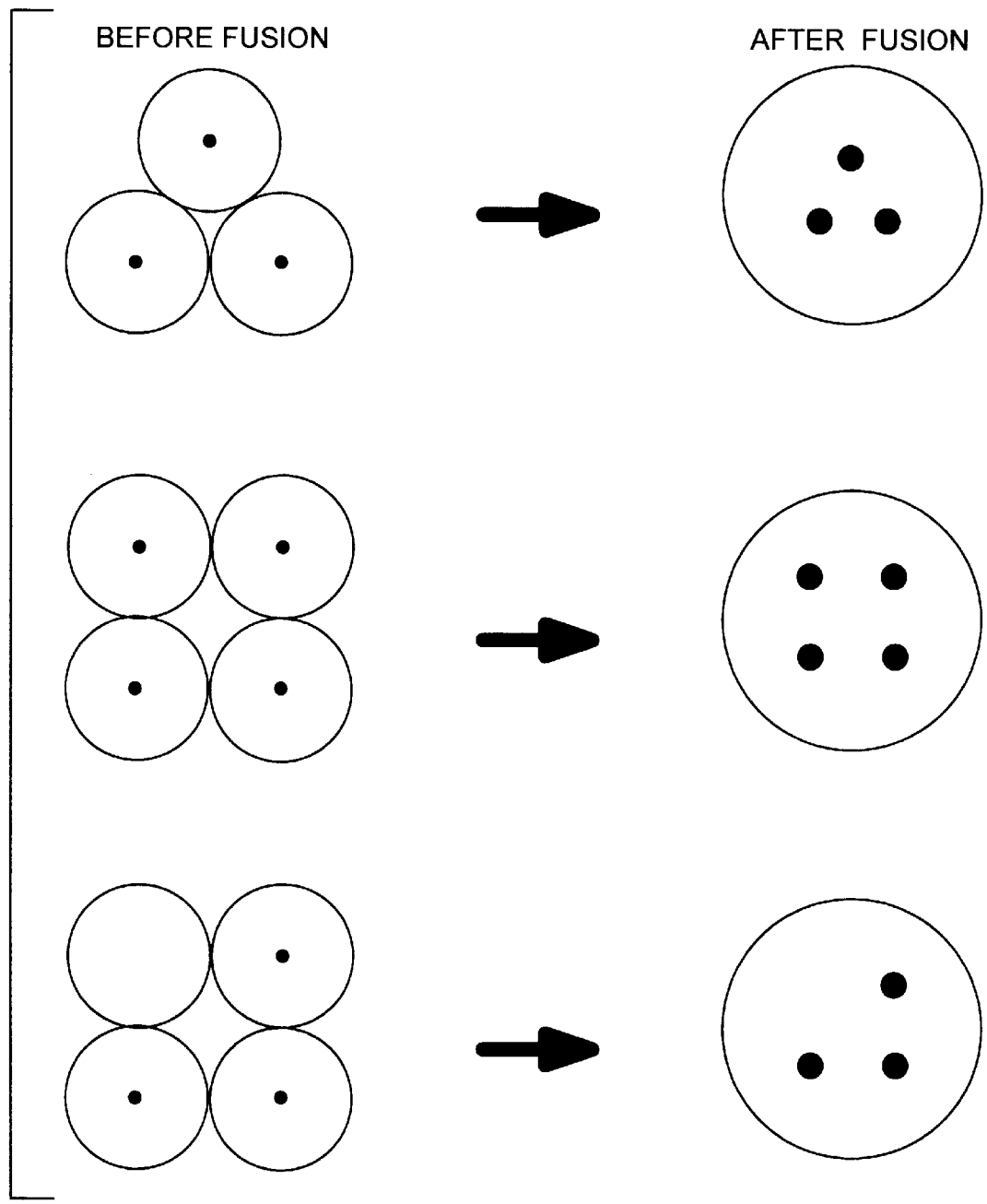
FIG. 10 illustrates cross-sections of alternative embodiments of a multiple core fiber after a fusion process.

The above described process is not limited to only fibers having multiple cores substantially aligned within one line, but may also be used to fabricate fibers having cores that aligned in other arrangements as illustrated in FIG. 10. Furthermore, the dimensions provided herein are only for exemplary purposes and other dimensions may be used.

As previously mentioned, the TEMC fiber may be used with an optical isolator to propagated light among cores of the TEMC fiber. The optical isolator operates to transmit light propagated in a forward direction from an input core to an output core of the TEMC fiber while inhibiting light propagated in a reverse direction from the output core to the input core.

Figure 11A:
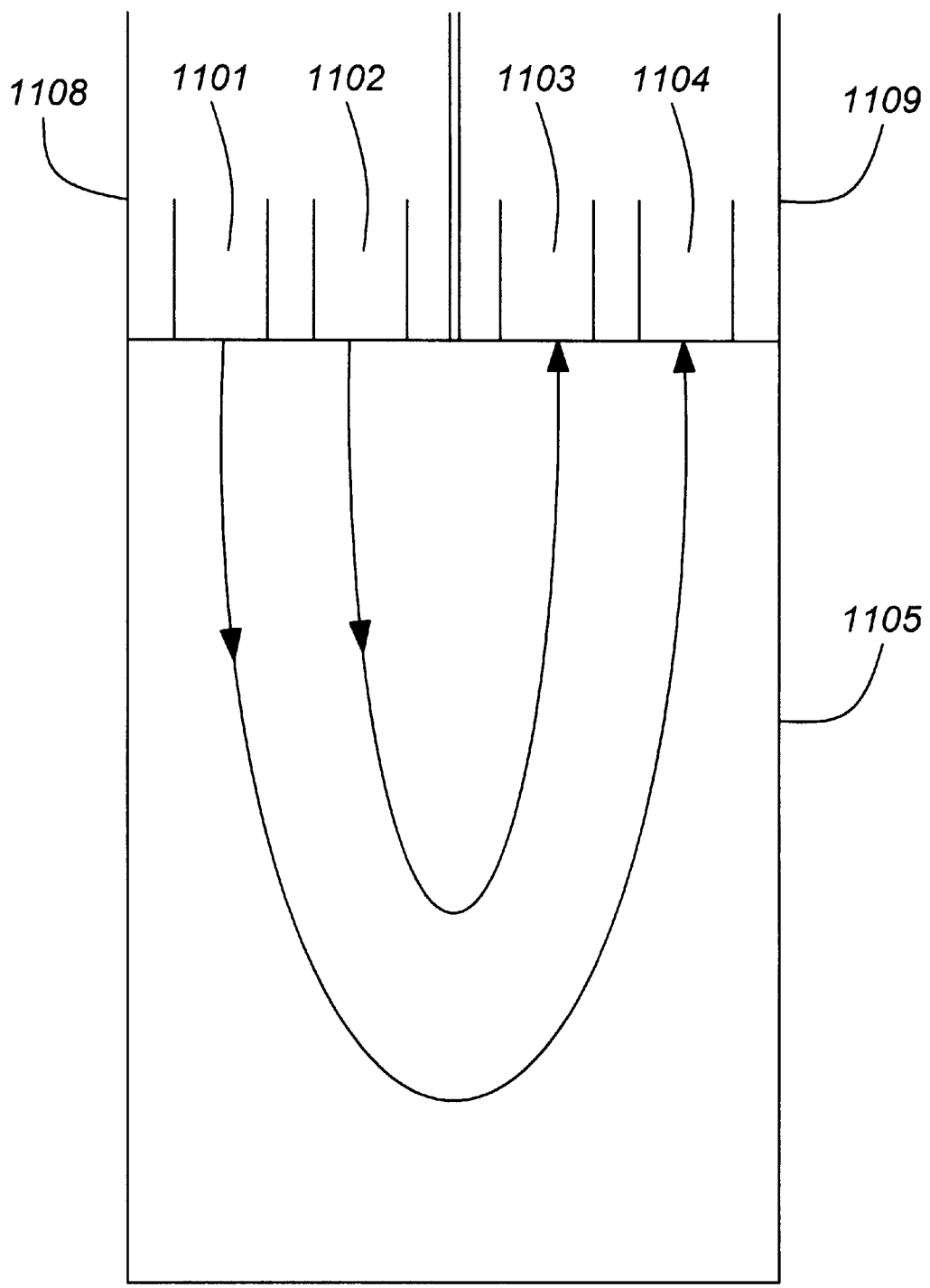
FIG. 11A is a conceptual illustration of the operation of one embodiment of an optical isolator using a TEMC fiber.

FIG. 11A is a conceptual illustration of the operation of one embodiment of an optical isolator using a TEMC fiber. In one embodiment, two TEMC fibers 1108 and 1109 are coupled to optical isolator 1105. TEMC fiber 1108 includes input cores 1101 and 1102. TEMC fiber 1109 includes output cores 1103 and 1104. In one embodiment, optical isolator 1105 operates to propagate light from input cores 1101 and 1102 to output cores 1104 and 1103, respectively, while inhibiting the propagation of light from output cores 1104 and 1103 to input cores 1101 and 1102, respectively. Optical isolator 1105 is shown with two, twin core TEMC fibers only for illustrative purposes. In alternative embodiments, more or less than two TEMC fibers having other than twin cores may be used.

Figure 11B:
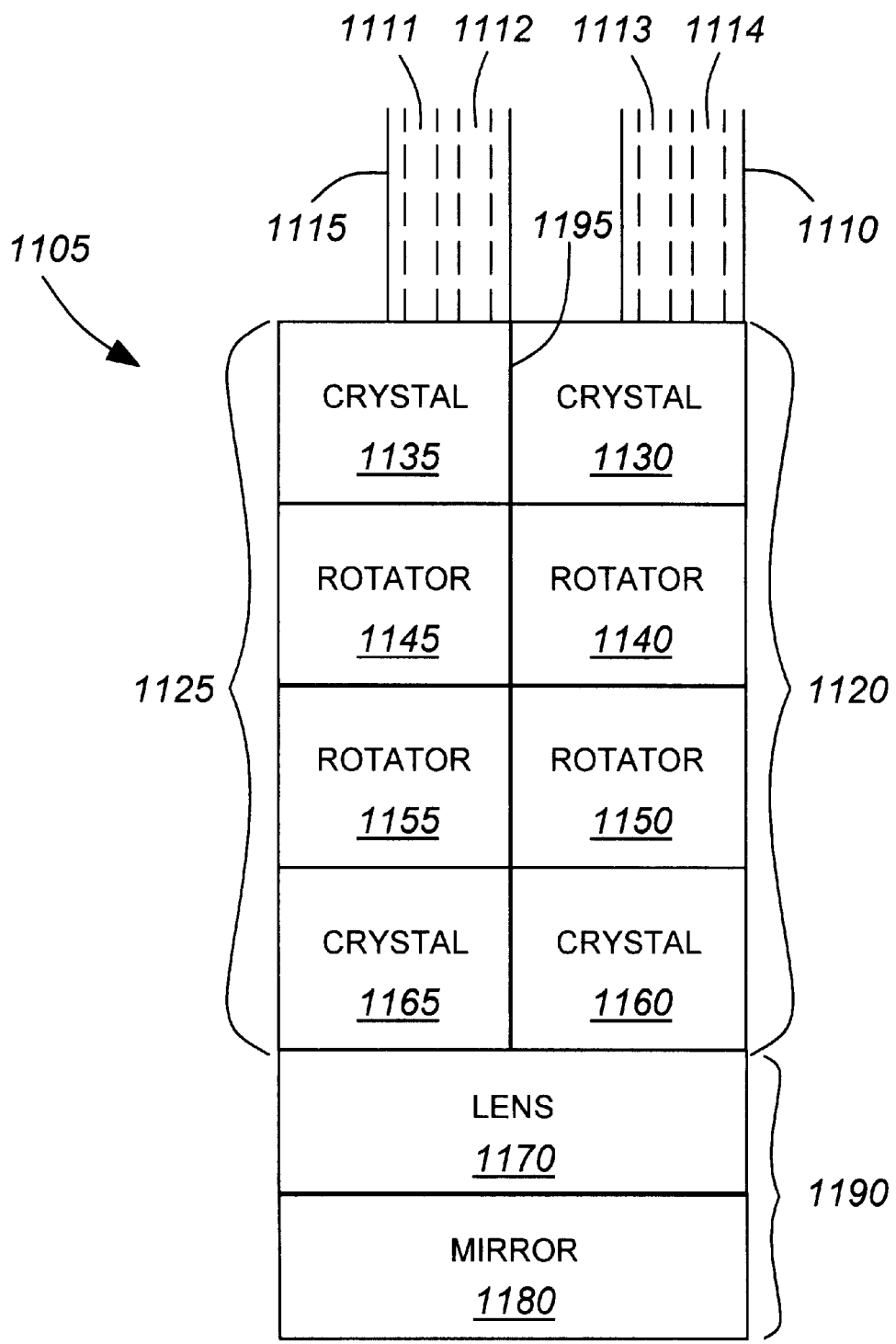
FIG. 11B illustrates one embodiment of an optical isolator with a TEMC fiber.

FIG. 11B illustrates one embodiment of an optical isolator used with a TEMC fiber. Optical isolator 1105 includes two isolator cores 1125 and 1120 coupled to TEMC fibers 1115 and 1120, respectively, and a reflection core 1190. Optical isolator 1105 operates to transmit light from input cores 1111 and 1112 of TEMC fiber 1115 to output cores 1114 and 1113, respectively, of TEMC fiber 1110. Optical isolator 1105 also operates to inhibit the propagation of light from output cores 1114 and 1113 of TEMC fiber 1110 to input cores 1111 and 1112, respectively, of TEMC fiber 1115. In one embodiment, the propagation of light from output cores 1114 and 1113 is substantially isolated such that only a small leakage may be propagated to input cores 1111 and 1112, respectively.

Isolator core 1125 may include walk-off crystals 1135 and 1165. Walk-off crystals 1135 and 1165 are crystals of birefringent material that split an unpolarized light beam into two orthogonally polarized light beams. When an anisotropic (birefringent) crystal is cut at a certain angle relative to its optical axis, the crystal will cause a component of light in a particular polarization direction to be diverted into a different path as it passes through the crystal, resulting in two components propagating through the crystal. The two components may be referred to as an ordinary ray and an extraordinary ray. The amount of divergence is proportional to the thickness of the crystal. The direction of divergence of the diverted polarization component is referred to as the walk-off direction of the crystal. A birefringent crystal, however, will only divert the polarization component in a polarization plane parallel to the walk-off direction and will not effect the polarization component in a plane perpendicular to the walk-off direction.

In addition, a walk-off crystal is a reciprocal device such that the divergence of light passed through the crystal in a forward direction is opposite that of light passed through the crystal in a backward direction. Furthermore, two orthogonally polarized light beams are recombined into a single light beam when passed through a walk-off crystal.

In one embodiment, walk-off crystals 1135 and 1165 are constructed from a birefringent crystal having a high index of refraction, for example, rutile ($TiO_2$). Rutile has an index of refraction for the ordinary ray ($n_o$) of 2.451 and an index of refraction for the extraordinary ray ($n_e$) of 2.709 at 1550 nanometer (nm) wavelength light.

In another embodiment, walk-off crystals 1135 and 1165 are constructed from other birefringent materials, for examples, calcite ($CaCO_3$) and yttrium vanadate ($YVO_4$). Yttrium vanadate, for example, has an index of refraction for the ordinary ray ($n_o$) of 2.1486 and an index of refraction for the extraordinary ray ($n_e$) of 1.9447 at 1550 nm wavelength light. By using a crystal with a high index of refraction, the angular divergence of light exiting the optical isolator may be reduced. In one embodiment, walk-off crystals 1135 and 1165 are constructed from the same material. In another embodiment, walk-off crystals 1135 and 1165 may be constructed of different materials.

Isolator core 1125 may also include polarization rotators 1145 and 1155 disposed between walk-off crystals 1135 and 1165. In one embodiment, polarization rotator 1145 is a Faraday rotator and polarization rotator 1155 is a half-wave plate. Faraday rotator 1145 operates to rotate the plane of polarization of light passed through it. A Faraday rotator is a non-reciprocal device that rotates the plane of polarization of light in the same direction when light is passed through it in either direction. Even though Faraday rotators are set to perform a certain rotation at a certain temperature and wavelength of light, slight variations in both temperature and wavelength may introduce an error angle resulting in minor components of light beams at other polarization angles, referred to as leakage. Although these minor components may not be completely isolated, they are not shown for ease of illustration purposes. Only the major components of the polarized light beams are discussed and illustrated in the embodiments herein.

Half-wave plate 1155 also operates to rotate the plane of polarization of light passed through it. A half-wave plate is a reciprocal device that rotates the plane of polarization of light based on the direction which light is passed through it.

In one embodiment, isolator core 1120 includes polarization rotators 1140 and 1150 disposed between walk-off crystals 1130 and 1160. Polarization rotators 1140 and 1150 may be similar to polarization rotators 1145 and 1155 of isolator core 1125. Isolator core 1120 also includes polarization rotator 1150 similar to polarization rotator 1155 of isolator core 1125 except that polarization rotator 1150 has its direction of rotation set opposite to that of polarization rotator 1155. In one embodiment, walk-off crystals 1130 and 1160 may be similar to the walk off crystals of isolator core 1125 except that walk-off crystals 1130 and 1160 have walk-off directions that are rotated 90 degrees relative to the walk-off directions of walk-off crystals 1135 and 1165.

A walk-off crystal, a Faraday rotator, and a half-wave plate are well known in the art; accordingly, a more detailed description of their internal composition and their operation is not provided herein. In one embodiment, the TEMC fiber and optical components may be physically coupled together using an adhesive. In another embodiment, the optical components may be physically coupled using other means, for example, a mechanical fastener. The optical components discussed herein may be obtained from industry manufacturers, for example, Melles Griot, Inc. of Irvine, Calif.

In one embodiment, reflection core 1190 includes a lens 1170 and a mirror 1180. Lens 1170 collimates light received from isolator core 1125 onto mirror 1180. Mirror 1180 and lens 1170 operate to direct light to a location of isolator core 1120 such that the light from input cores 1111 and 1112 is coupled to output cores 1114 and 1113, respectively.

Figure 12:
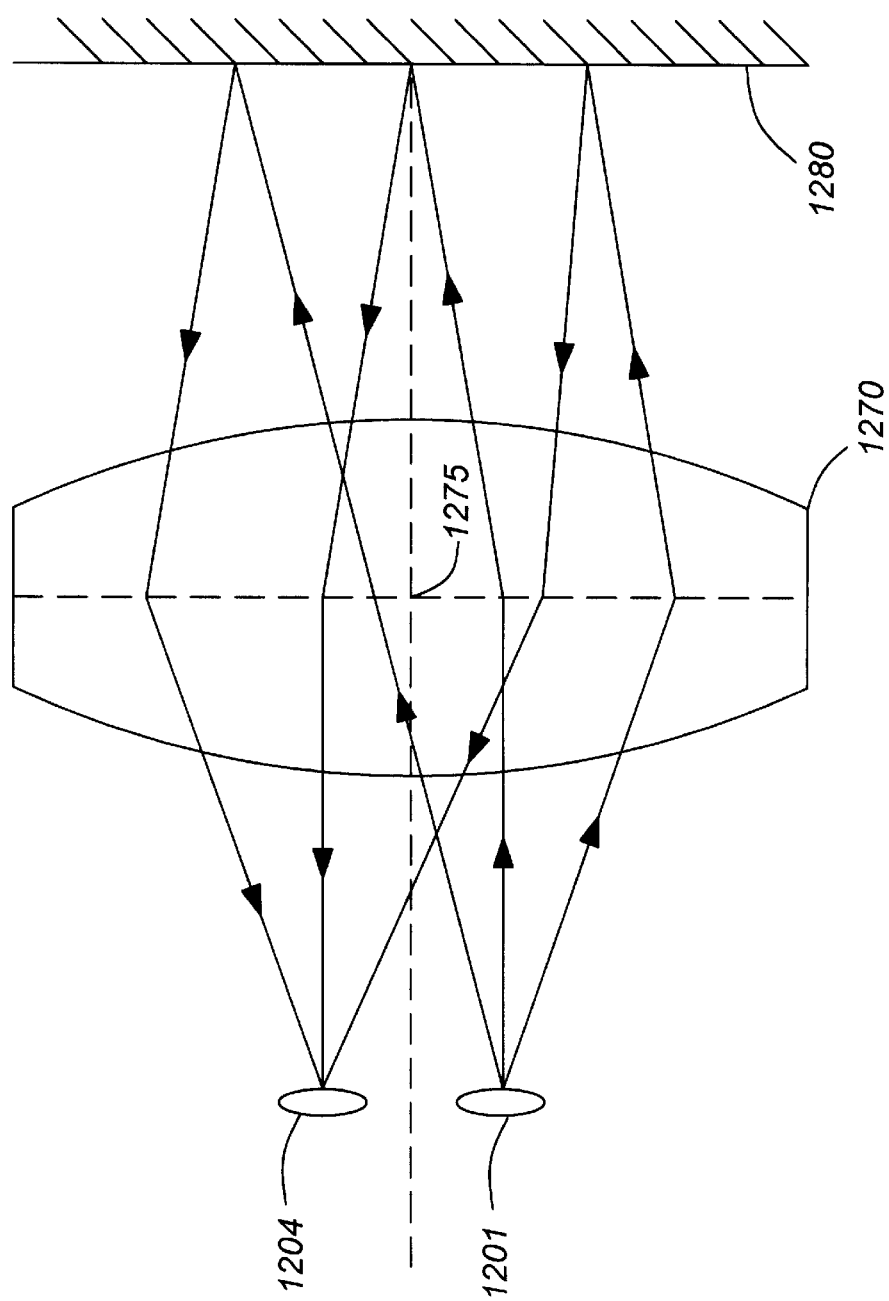
FIG. 12 illustrates the propagation of light through a lens.

FIG. 12 illustrates the propagation of light through a lens. Light beam 1201 transmitted from isolator core 1125 of FIG. 11B to lens 1270 is collimated by lens 1270 and reflected back to lens 1270 by mirror 1280. The reflect light 1204 focused into isolator core 1120 of FIG. 11B is the mirror image of light beam 1201 as discussed below in relation to FIG. 13.

Figure 13:
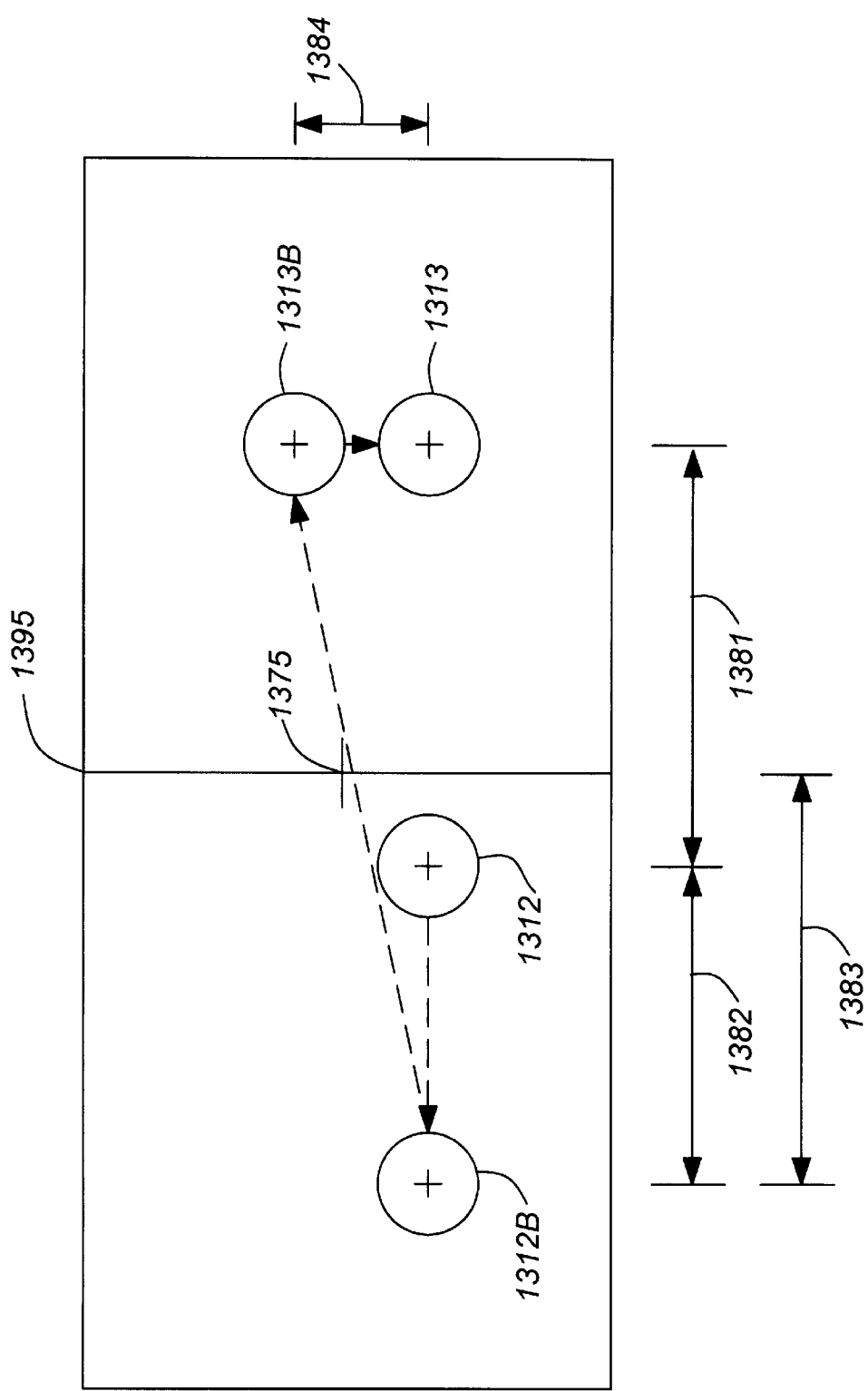
FIG. 13 illustrates a cross-sectional view of light reflection off a mirror.

FIG. 13 illustrates a cross-sectional view of light reflection off a mirror. Isolator cores 1125 and 1120 of FIG. 11B are positioned adjacent each other along side 1395. Light beam position 1312 represents the position of a light beam exiting fiber 1115 of FIG. 11B. Light beam position 1313 represents the position of a light beam entering fiber 1110 of FIG. 11B. The fibers are separated a fixed distance 1381 apart. Light beam position 1312B represents the position of a light beam as it exits isolator core 1125 of FIG. 11B. Light beam position 1313B represents the position of a light beam as it enters isolator core 1120 of FIG. 11B. Light beam position 1312B is offset from light beam position 1312 a distance 1382 that is equal to the walk-off distance of the walk-off crystals 1135 and 1165 of FIG. 11B. Axis 1375 represents the position of the optical axis of 1275 of lens 1270 of FIG. 12.

As such, light beam 1312B reflected by mirror 1280 of FIG. 12 will be displaced away from the optical axis 1365 in a horizontal direction a distance that is equal to its distance 1383 away from axis 1375. The reflected light beam 1312B will be displaced away from axis 1375 in a vertical direction a distance that is equal to the distance 1384 of light beam position 1312B from axis 1375. In one embodiment, distance 1381 is approximately equal to 114 µm, distance 1382 is approximately equal to 100 µm, and distance 1384 is approximately equal to 100 µm. In other embodiments, distances 1381, 1382, and 1384 may have other dimensions based on the walk-off distances of the crystals and the separation of cores in the TEMC fibers used in the optical isolator.

A lens and a mirror are well known in the art; accordingly, a more detailed description of their internal composition and their operation is not provided herein. The lens and mirror discussed herein may be obtained from industry manufacturers, for example, Melles Griot, Inc. of Irvine, Calif.

Figure 14:
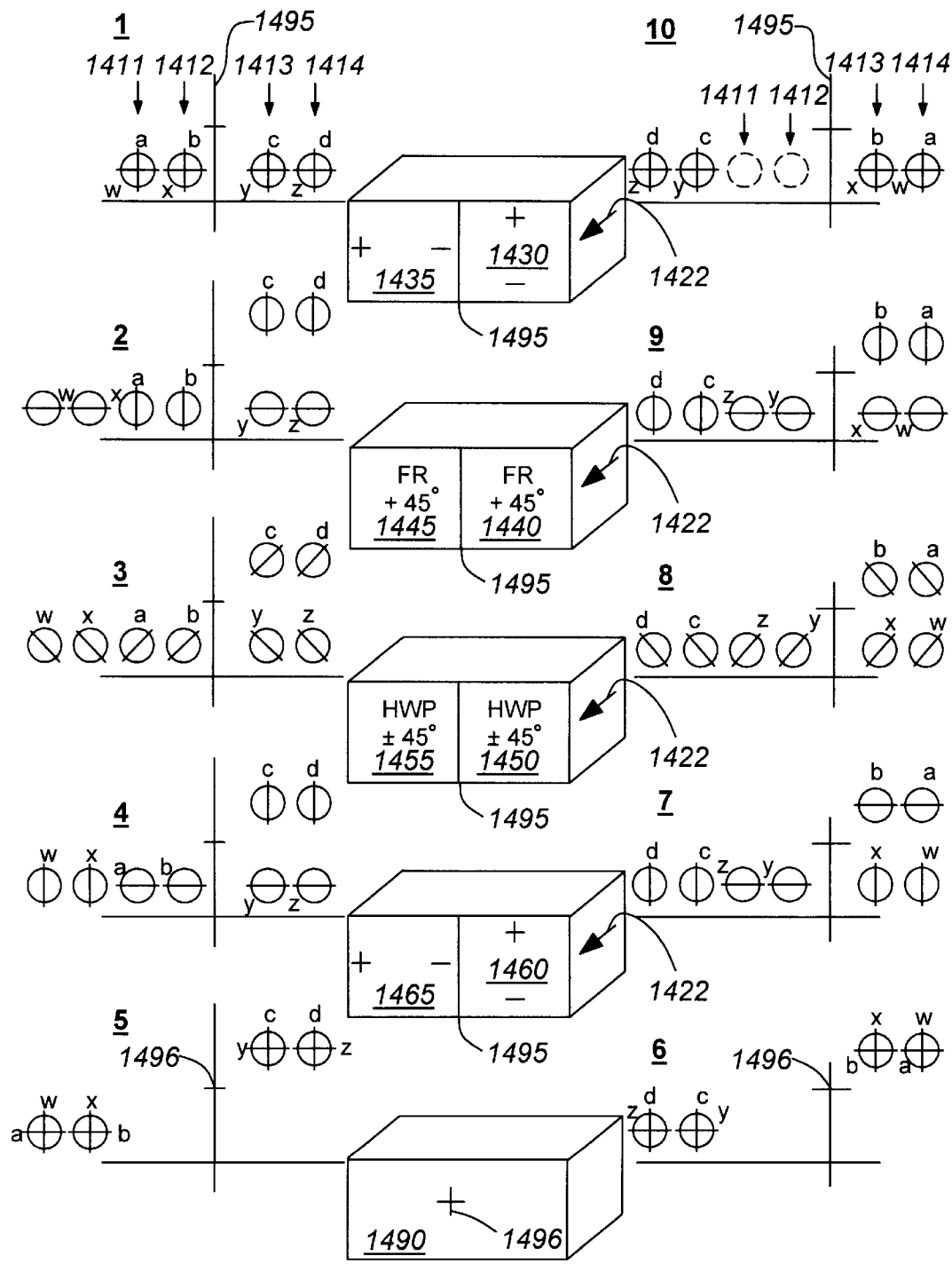
FIG. 14 illustrates polarization orientations of light beams propagated through one embodiment of the optical isolator.

FIG. 14 illustrates polarization orientations of light beams propagated through one embodiment of the optical isolator. The cross-sections of the components of isolator cores 1125 and 1120 of FIG. 11B are taken along planes perpendicular to the propagation path of a light beam as it travels from TEMC fibers 1115 and 1110 to reflection core 1190 of FIG. 11B. The components of isolator cores in FIG. 14 are arranged in the same order as shown in FIG. 11B. The walk-off directions for crystals 1430, 1435, 1460, and 1465 are shown by (+) and (−) symbols for one embodiment. The walk-off direction for light traveling in the forward direction 1422 from position 1 to position 5 is from (−) to (+). For light travel in the reverse direction from position 6 to position 10, the walk-off direction is from (+) to (−).

Light beam locations 1411–1414 represent light beams incident on walk-off crystals 1435 and 1430 that are received from cores 1111–1114, respectively, of FIG. 11. Positions 1 through 5 show the polarization effects of the isolator components on light beams 1411 and 1412 as they pass through walk-off crystal 1435, Faraday rotator 1445, half-wave plate 1455, and walk-off crystal 1465 in the forward direction. In addition, positions 1 through 5 show the polarization effects of the isolator components on light beams 1413 and 1414 as they pass through walk-off crystal 1430, Faraday rotator 1440, half-wave plate 1450, and walk-off crystal 1460 in the forward direction.

Light beams at locations 1411, 1412,1413, and 1414 are each split into two orthogonally polarized light beams when passed through walk-off crystal 1435 in forward direction 1422. Light beam polarization components a, b, c, and d corresponding to light beams from locations 1411, 1412, 1413, and 1414, respectively, are polarized in a plane that is perpendicular to the walk-off direction of crystal 1435. Light beam polarization components w, x, y, and z corresponding to light beams from locations 1411, 1412, 1413, and 1414, respectively, are polarized in a plane that is parallel to the walk-off direction of crystal 1435.

Light beam polarization components w and x are offset from light beam polarization components a and b, respectively, by a distance proportional to the thickness of walk-off crystal 1435. Light beam polarization components y and z are offset from light beam polarization components c and d, respectively, by a distance proportional to the thickness of walk-off crystal 1430.

The thickness of the walk-off crystals are selected to divert the light beams a distance that will not result in overlap between diverted light beam polarization components w, x, y, and z and light beam polarization components a, b, c, and d. At position 2, light beam polarization components w and x are polarized parallel to the walk-off direction of walk-off crystal 1435 and light beam polarization components a and b are polarized perpendicular to the walk-off direction of walk-off crystal 1435. Whereas, light beam polarization components c and d are polarized parallel to the walk-off direction of walk-off crystal 1430 and light beam polarization components y and z are polarized perpendicular to the walk-off direction of walk-off crystal 1430.

In one embodiment, Faraday rotators 1445 and 1440 rotate the planes of polarization of light beam polarization components a, b, c, d, w, x, y, and z by approximately 45 degrees in a clockwise direction as they pass through in forward direction 1422, resulting in the orientations shown at position 3.

In one embodiment, half-wave plate 1455 rotates the planes of polarization of light beam polarization components a, b, w, and x by approximately (positive) 45 degrees in a clockwise direction as the components pass through in forward direction 1422. Half-wave plate 1450 rotates the planes of polarization of light beam polarization components c, d, y, and x by approximately (negative) 45 degrees in a counterclockwise direction as the components pass through in forward direction 1422. The resulting orientations of the light beam polarization components are shown at position 4. In an alternative embodiment, the position of Faraday rotators 1445 and 1140 is witched with half-wave plates 1455 and 1450.

In one embodiment, walk-off crystals 1465 and 1460 are selected to have the same walk-off divergence and direction as walk-off crystals 1435 and 1430, respectively. At position 4, light beam polarization components a and b are polarized in a plane parallel to the walk-off direction of crystal 1465, and light beam polarization components c and d are polarized in a plane parallel to the walk of direction of crystal 1460. When light beam polarization components a and b pass through walk-off crystal 1465, they will be diverted in the same direction and by the same amount as light beam polarization components w and x at position 2.

As such, the light beam polarization components a and b are recombined with components w and x, respectively, when passed through walk-off crystal 1465 as shown at position 5. Similarly, light beam polarization components c and d are recombined with components y and z, respectively, when passed through walk-off crystal 1460 as shown at position 5.

The walk-off crystals 1465 and 1460 also function to reduce polarization mode dispersion effects. When light is split into two different beams by walk-off crystals 1430 and 435, the two different light beams travel at different velocities.

This difference in velocity results in what is known as polarization mode dispersion (PMD). By causing the non-divergent beams a, b, y, and z in walk-off crystals 1435 and 1430 to diverge when passing through walk-off crystals 1465 and 1460, the velocities of the two beams are equalized, thereby reducing PMD.

In one embodiment, light beam polarization components a, w, b, x, c, y, d, and z are propagated through a reflection core 1490 having a lens and a mirror with an optical axis 1496. As discussed above in relation to FIGS. 12 and 13, the light beams reflected from reflection core 1490 are the mirror image of the incident light beams, as shown at position 6. The reflection core 1490 is not limited to only a lens and a mirror and may have other component configurations to reflect incident light beams, for example, reflection core 1490 may be configured as a concave mirror.

Light beam polarization components a, w, b, and x at position 6 will be propagated in a reverse direction through components 1460, 1450, 1440, and 1430 as shown in positions 7–10. Whereas, light beam polarization components c, y, d, and z at position will be propagated in a reverse direction through components 1465, 1455, 1445, and 1435 as shown in positions 7–10.

As shown in position 10, light beam polarization components a and w (originally propagated to the isolator at location 1411) are propagated to location 1414 and light beam polarization components b and x (originally propagated to the isolator at location 1412) are propagated to location 1413. However, light beam polarization components c and y from location 1413, and d and z from location 1414 are not propagated to locations 1411 and 1412 as shown by the dashed circles at position 10. In this manner, light from cores 1113 and 1114 of FIG. 11B is isolated from cores 1111 and 1112.

In alternative embodiments, other configurations of optical components may be used, for example, the position of half-wave plate 1455 may be switched with half-wave plate 1450 with the isolation of light between cores 1111–1112 and 1113–1114, correspondingly, reversed.

In one embodiment, the mode field diameter of a light beam expands as it propagates through the optical isolator from fiber 1115 to fiber 1110. As such, the fibers must be spaced far enough apart to accommodate the expanded mode field diameter. In one embodiment, fibers 1115 and 1110 are single mode fibers having step index core profiles with a numerical aperture (NA) of approximately 0.1 and mode field diameters of approximately 10 μm at 1550 nm. Single mode fibers may be obtained from optical fiber manufacturers, for example, Corning of Corning, N.Y. In one embodiment, fibers 1115 and 1110 are aligned next to each other such that the centers of cores 1112 and 1113 are spaced approximately 114 μm apart. In another embodiment, other configurations for the TEMC fibers may be used, for example, a single TEMC fiber may be used having four cores and non-core spacers to separate the cores.

The mode field diameter of the beam may be approximated as the mode field diameter of the fiber plus the mode field diameter of the isolator. The mode field diameter of the isolator may be approximated as twice the numerical aperture multiplied by the total effective air thickness of the isolator. By using a walk-off crystal with a high index of refraction, a lower effective air thickness is obtained, thereby allowing for a smaller fiber separation.

As previously discussed, the optical isolator cores are not limited to only the crystal, half-wave plate, and Faraday rotator configurations illustrated in FIG. 14. In another embodiment, the optical isolator includes crystals, half-wave plates, and Faraday rotators of other configurations to propagate light between fibers in one direction and inhibit light propagation in the opposite direction.

Figure 15:
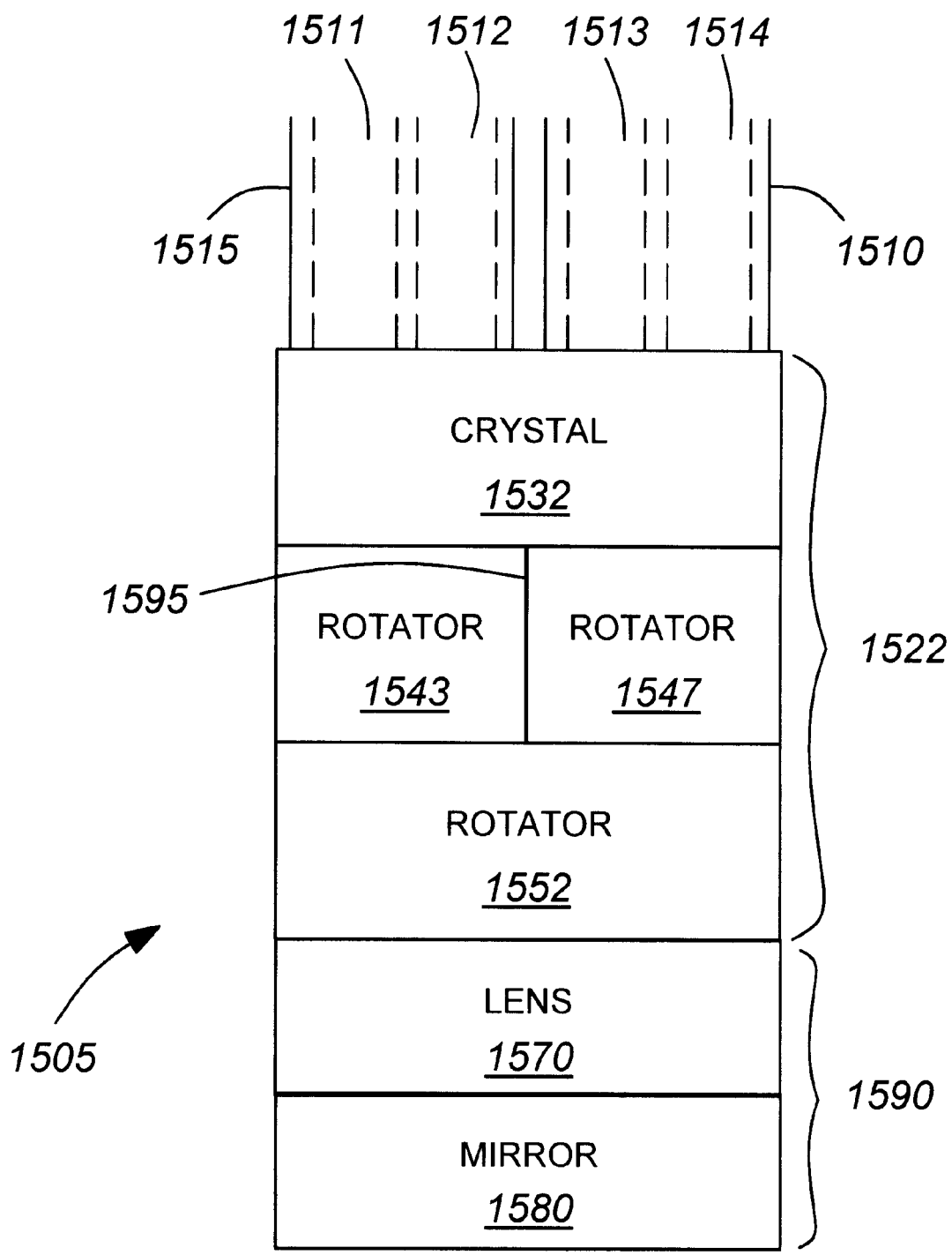
FIG. 15 illustrates another embodiment of an optical isolator with a TEMC fiber.

FIG. 15 illustrates another embodiment of an optical isolator used with a TEMC fiber. Optical isolator 1505 includes an isolator core 1522 coupled to TEMC fibers 1515 and 1510 and a reflection core 1590. Optical isolator 1505 operates to transmit light from input cores 1511 and 1512 of TEMC fiber 1515 to output cores 1514 and 1513, respectively, of TEMC fiber 1510. Optical isolator 1505 also operates to inhibit the propagation of light from output cores 1514 and 1513 of TEMC fiber 1510 to input cores 1511 and 1512 of TEMC fiber 1515.

In one embodiment, reflection core 1590 includes a lens 1570 and a mirror 1580. Lens 1570 and mirror 1580 operate similar to that described above in relation to FIGS. 12 and 13.

Figure 16:
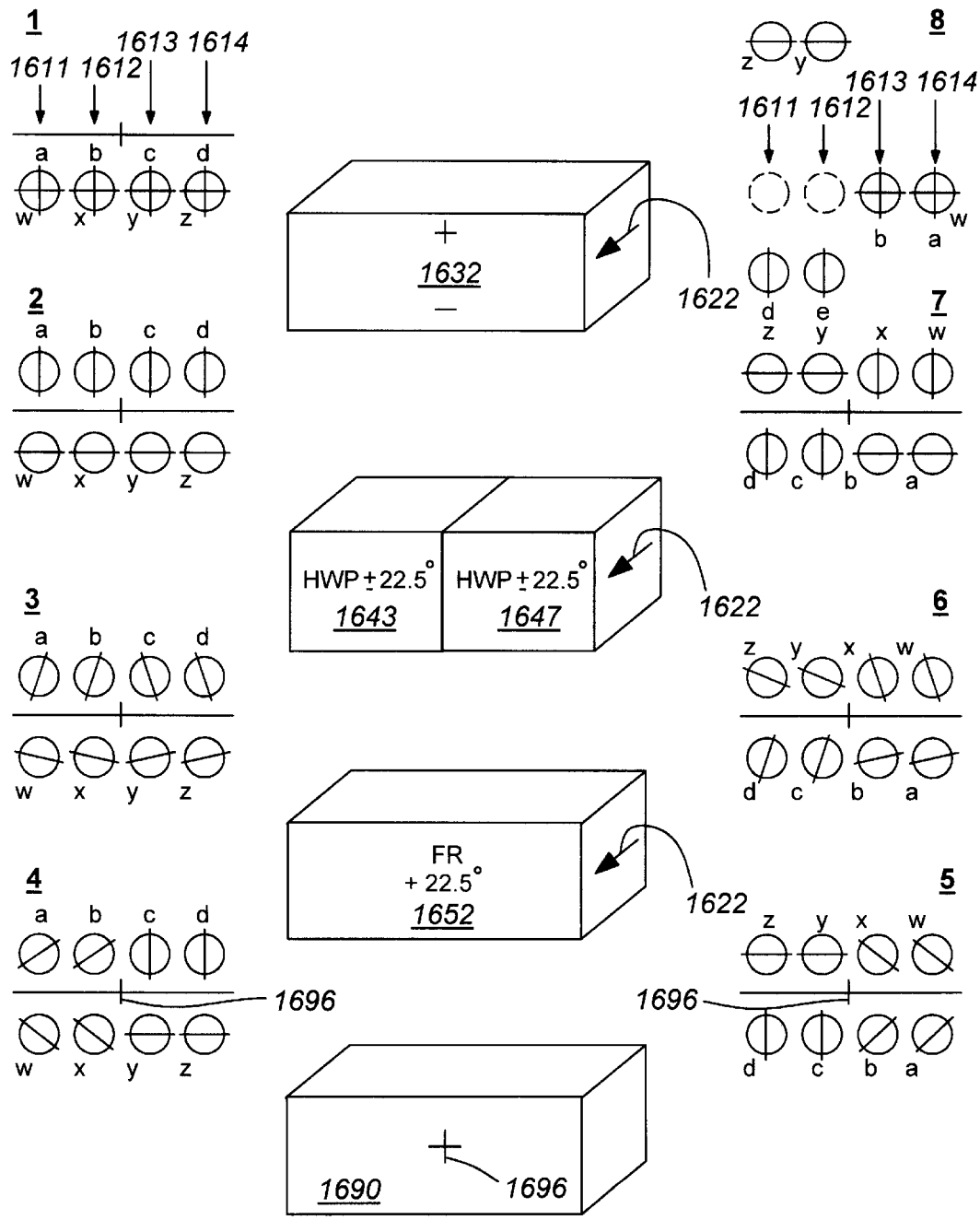
FIG. 16 illustrates polarization orientations of light beams propagated through another embodiment of the optical isolator.

FIG. 16 illustrates polarization orientations of light beams propagated through one embodiment of the optical isolator 1505 of FIG. 15. The cross-sections of the components of the isolator are taken along planes perpendicular to the propagation path of a light beam as it travels from TEMC fibers 1515 and 1510 to reflection core 1590 of FIG. 15. The components of the isolator in FIG. 16 are arranged in the same order as shown in FIG. 15. The walk-off directions for crystal 1632 are shown by (+) and (−) symbols for one embodiment. The walk-off direction for light traveling in the forward direction 1622 from position 1 to position 4 is from (−) to (+). For light travel in the reverse direction from position 5 to position 8, the walk-off direction is from (+) to (−).

Light beam locations 1611–1614 represent light beams incident on walk-off crystal 1632 that are received from cores 1511–1514, respectively, of FIG. 15. Positions 1 through 4 show the polarization effects of the isolator components on light beams 1611–1614 as they pass through walk-off crystal 1632, half-wave plates 1643 and 1647, and Faraday rotator 1652 in a forward direction 1622.

Light beams at locations 1611, 1612, 1613, and 1614 are each split into two orthogonally polarized light beams when passed through walk-off crystal 1632 in forward direction 1622. Light beam polarization components a, b, c, and d, corresponding to light beams from locations 1611, 1612, 1613, and 1614, respectively, are polarized in a plane that is parallel to the walk-off direction of crystal 1632. Light beam polarization components w, x, y, and z corresponding to light beams from locations 1611, 1612, 1613, and 1614, respectively, are polarized in a plane that is perpendicular to the walk-off direction of crystal 1632.

Light beam polarization components a, b, c, and d are offset from light beam polarization components w, x, y, and z, respectively, by a distance proportional to the thickness of walk-off crystal 1632. The thickness of walk-off crystal 1632 is selected to divert the light beams a distance that will not result in overlap between diverted light beam polarization components a, b, c, and d, and light beam polarization components w, x, y, and z. At position 2, light beam polarization components w, x, y, and z are polarized perpendicular to the walk-off direction of walk-off crystal 1632 and light beam polarization components a, b, c, and d are polarized parallel to the walk-off direction of walk-off crystal 1632.

In one embodiment, half-wave plate 1643 rotates the planes of polarization of light beam polarization components a, b, w, and x by approximately (positive) 22.5 degrees in a clockwise direction as they pass through in forward direction 1622. Whereas, half-wave plate 1647 rotates the planes of polarization of light beam polarization components c, d, y, and z by approximately (negative) 22.5 degrees in a counterclockwise direction as they pass through in forward direction 1622. The resulting orientations are shown at position 3. The polarization components then pass through Faraday rotator 1652.

In one embodiment, Faraday rotator 1652 rotates the planes of polarization of light beam polarization components a, w, b, x, c, y, d, and z by approximately (positive) 22.5 degrees in a clockwise direction as the components pass through in forward direction 1622, resulting in the orientations as shown at position 4. In an alternative embodiment, the position of Faraday rotator 1652 and the half-wave plates 1643, 1647 may be switched.

Light beam polarization components a, w, b, x, c, y, d, and z are propagated through reflection core 1690. In one embodiment, reflection core 1690 includes a lens and a mirror with an optical axis 1696. As discussed above in relation to FIGS. 12 and 13, the light beams reflected from reflection core 1690 are the mirror image of the incident light beams, as shown at position 5. The reflection core 1690 is not limited to only a lens and a mirror and may have other component configurations to reflect incident light beams, for example, reflection core 1690 may be configured as a concave mirror.

Light beam polarization components a, w, b, and x at position 5 will be propagated in a reverse direction through components 1652, 1647, and 1632 as shown in positions 6–8. Whereas, light beam polarization components c, y, d, and z at position 5 will be propagated in a reverse direction through components 1652, 1643, and 1632 as also shown in positions 6–8.

As shown at position 8, light beam polarization components a and w (originally incident on the isolator at location 1611) are propagated to location 1414 and light beam polarization components b and x (originally incident on the isolator at location 1612) are propagated to location 1613. However, light beam polarization components c and y from location 1613, and d and z from location 1614 are not propagated to locations 1611 and 1612, as shown by the dashed circles at position 8. In this manner, light beams from cores 1511 and 1512 are propagated to cores 1514 and 1513, respectively, while light beams from cores 1513 and 1514 are isolated from cores 1511 and 1512 of FIG. 15.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An optical isolator, comprising:
    a thermally expanded multiple core fiber having at least one input core and at least one output core; and
    an isolator core coupled to the thermally expanded multiple core fiber to propagate light from the at least one input core to the at least one output core and inhibit the propagation of light from the at least one output core to the at least one input core.

2. The optical isolator of claim 1, further comprising a reflection core coupled to the isolator core.

3. The optical isolator of claim 2, wherein the reflection core comprises a lens coupled to a mirror.

4. The optical isolator of claim 2, wherein the isolator core comprises:
    a plurality of polarization rotators; and
    a walk-off crystal coupled to at least one of the plurality of polarization rotators.

5. The optical isolator of claim 4, wherein the plurality of polarization rotators comprises:
    a non-reciprocal rotator; and
    a first and a second reciprocal rotators.

6. The optical isolator of claim 5, wherein the non-reciprocal rotator is a Faraday rotator that rotates the planes of polarization of light by approximately 22.5 degrees in a forward direction.

7. The optical isolator of claim 5, wherein the first reciprocal rotator is a half-wave plate that rotates the planes of polarization of light by approximately 22.5 degrees in the forward direction, and wherein the second reciprocal rotator is a half-wave plate rotates the planes of polarization of light by approximately negative 22.5 degrees in the forward direction.

8. The optical isolator of claim 4, wherein the walk-off crystal has an index of refraction greater than approximately 2.0.

9. The optical isolator of claim 8, wherein the walk-off crystal is constructed of rutile.

10. An optical isolator, comprising:
    a thermally expanded multiple core fiber having at least one input core and at least one output core; and
    a first isolator core and second isolator core coupled to the thermally expanded multiple core fiber to propagate light from the at least one input core to the at least one output core and inhibit the propagation of light from the at least one output core to the at least one input core.

11. The optical isolator of claim 10, further comprising a reflection core coupled to the first and the second isolator cores.

12. The optical isolator of claim 11, wherein the reflection core comprises a lens coupled to a mirror.

13. The optical isolator of claim 12, wherein the first isolator core comprises:
    a first walk-off crystal having a first walk-off direction;
    a second walk-off crystal having a second walk-off direction;
    a first non-reciprocal rotator disposed between the first and the second walk-off crystals; and
    a first reciprocal rotator disposed between the first and the second walk-off crystals.

14. The optical isolator of claim 13, wherein the second isolator core comprises:
    a third walk-off crystal having a third walk-off direction;
    a fourth walk-off crystal having a fourth walk-off direction;
    a second non-reciprocal rotator disposed between the third and the fourth walk-off crystals; and
    a second reciprocal rotator disposed between the third and the fourth walk-off crystals.

15. The optical isolator of claim 14, wherein the first walk-off direction is the same as the second walk-off direction and the third walk-off direction is the same as the fourth walk-off direction.

16. The optical isolator of claim 15, wherein the third walk-off direction is rotated approximately 90 degrees with respect to the first walk-off direction.

17. The optical isolator of claim 16, wherein the first reciprocal rotator, the first non-reciprocal rotator, and the second non-reciprocal rotator rotate the plane of polarization of light by the predetermined angle in the forward direction.

18. The optical isolator of claim 17, wherein the second reciprocal rotator rotates the plane of polarization of the light by a negative of the predetermined angle in the forward direction.

19. The optical isolator of claim 18, wherein the predetermined angle is approximately 45 degrees.

20. The optical isolator of claim 19, wherein the first and the second non-reciprocal rotators are the same component.

* * * * *